US010846040B2

(12) United States Patent
Moritani et al.

(10) Patent No.: US 10,846,040 B2
(45) Date of Patent: Nov. 24, 2020

(54) INFORMATION PROCESSING APPARATUS, INFORMATION PROCESSING METHOD, AND NON-TRANSITORY COMPUTER-READABLE RECORDING MEDIUM

(71) Applicant: CASIO COMPUTER CO., LTD, Shibuya-ku (JP)

(72) Inventors: Shinichi Moritani, Kawasaki (JP); Tomokazu Yamaguchi, Nakano (JP); Keiichi Imamura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 130 days.

(21) Appl. No.: 15/379,236

(22) Filed: Dec. 14, 2016

(65) Prior Publication Data

US 2017/0185360 A1    Jun. 29, 2017

(30) Foreign Application Priority Data

Dec. 24, 2015  (JP) .................. 2015-252316

(51) Int. Cl.
*G06F 3/14* (2006.01)
*H04M 1/00* (2006.01)
(Continued)

(52) U.S. Cl.
CPC ................ *G06F 3/14* (2013.01); *G06F 1/163* (2013.01); *G06F 3/0346* (2013.01);
(Continued)

(58) Field of Classification Search
CPC ...... G06T 11/206; G06F 1/163; G06F 3/0346; G06F 3/048; G06F 3/044; G06F 3/14;
(Continued)

(56) References Cited

U.S. PATENT DOCUMENTS 8,635,021 B2 * 1/2014 Heng ..................... G01C 21/00
340/995.27
10,001,898 B1 * 6/2018 Burtenshaw .......... G06F 3/0484
(Continued)

FOREIGN PATENT DOCUMENTS

| JP | H 8-299292 | 11/1996 |
|----|------------|---------|
| JP | 2001-289632 | 10/2001 |

(Continued)

OTHER PUBLICATIONS

Office Action dated Apr. 19, 2019 issued in Japanese Patent Application No. 2015-252316.
(Continued)

*Primary Examiner* — Sae Won Yoon
(74) *Attorney, Agent, or Firm* — Cozen O'Connor

(57) ABSTRACT

An information processing apparatus includes a first display unit and a drawing processing unit. The drawing processing unit acquires behavior history information based on behavior of a user. Further, the drawing processing unit acquires predetermined behavior information (past maximum value) from the behavior history information. Furthermore, the drawing processing unit simultaneously displays the acquired behavior history information and the acquired predetermined behavior information on the first display unit.

17 Claims, 8 Drawing Sheets

(51) Int. Cl.
*G06F 1/16* (2006.01)
*G06F 3/0346* (2013.01)
*G06T 11/20* (2006.01)
*G06F 3/044* (2006.01)
*G09G 3/36* (2006.01)

(52) U.S. Cl.
CPC .............. *G06T 11/206* (2013.01); *H04M 1/00* (2013.01); *G06F 3/044* (2013.01); *G09G 3/36* (2013.01); *G09G 2330/021* (2013.01); *G09G 2354/00* (2013.01)

(58) Field of Classification Search
CPC ............ A63B 71/0619; A63B 2220/00; A63B 2230/00; G04G 9/0064; G09G 3/36; G09G 2330/021; G09G 2354/00; H04M 1/00; G01C 5/06
USPC ........................................................ 345/440
See application file for complete search history.

(56) References Cited

U.S. PATENT DOCUMENTS

| | | | | |
|---|---|---|---|---|
| 2005/0248588 | A1* | 11/2005 | Freeman | G06T 11/206 345/660 |
| 2010/0048358 | A1* | 2/2010 | Tchao | G06F 19/3418 482/9 |
| 2011/0074788 | A1* | 3/2011 | Regan | G06T 11/00 345/440 |
| 2011/0133888 | A1* | 6/2011 | Stevens | G06Q 50/28 340/8.1 |
| 2011/0193704 | A1* | 8/2011 | Harper | A61B 5/14532 340/573.1 |
| 2011/0205063 | A1* | 8/2011 | Katingari | A61B 5/0006 340/573.1 |
| 2011/0302116 | A1 | 12/2011 | Ide et al. | |
| 2011/0313957 | A1* | 12/2011 | Ide | G01C 21/20 706/12 |
| 2012/0212493 | A1* | 8/2012 | Taylor | G06T 11/20 345/440.2 |
| 2013/0002533 | A1* | 1/2013 | Burroughs | G06F 19/3481 345/156 |
| 2014/0062703 | A1* | 3/2014 | Purks | A61B 5/1122 340/573.1 |
| 2014/0181748 | A1* | 6/2014 | Takeda | G06F 3/04817 715/835 |
| 2015/0061889 | A1* | 3/2015 | Kotaki | G06T 11/206 340/870.05 |
| 2015/0081059 | A1* | 3/2015 | Hwang | G01C 22/002 700/91 |
| 2016/0062450 | A1* | 3/2016 | Han | G06F 1/3265 715/778 |

FOREIGN PATENT DOCUMENTS

| | | |
|---|---|---|
| JP | 2008-524589 | 7/2008 |
| JP | 2011-252844 | 12/2011 |
| JP | 2014-132253 | 7/2014 |
| JP | 2014-193404 | 10/2014 |
| JP | 2015-047208 | 3/2015 |
| JP | 2015-509743 | 4/2015 |
| WO | WO 2013/086161 A2 | 6/2013 |
| WO | WO 2013/086161 A3 | 6/2013 |

OTHER PUBLICATIONS

Office Action dated Dec. 3, 2019 issued in Japanese Patent Application No. 2015-252316.

* cited by examiner

DEFICIENT AREA
WITHIN 1 HOUR

INTERPOLATION OF DEFICIENT
AREA WITH PREVIOUS VALUE
TO MAKE DEFICIENT AREA FLAT

DEFICIENT AREA
EXCEEDING 1 HOUR

INTERPOLATION OF DEFICIENT
AREA CORRESPONDING
TO ONLY 1 HOUR

MAXIMUM VALUE FOR PAST 24 HOURS

CALCULATED BASED ON AMPLITUDE FOR PAST 24 HOURS

ALTITUDE ZERO

INFORMATION PROCESSING APPARATUS, INFORMATION PROCESSING METHOD, AND NON-TRANSITORY COMPUTER-READABLE RECORDING MEDIUM

CROSS-REFERENCE TO RELATED APPLICATIONS

This application is based upon and claims the benefit of priority under 35 USC 119 of Japanese Patent Application No. 2015-252316 filed on Dec. 24, 2015 the entire disclosure of which, including the description, claims, drawings, and abstract, is incorporated herein by reference in its entirety.

BACKGROUND OF THE INVENTION

1. Field of the Invention

The present invention relates to an information processing apparatus, an information processing method, and a program.

2. Description of the Related Art

Conventionally, there has been known an altimeter that records a change in altitude based on behavior of a user and displays history information of the change in altitude.

JP 2001-289632 A discloses a portable altimeter that provides, to a user, behavior history information based on behavior of the user on the time axis.

BRIEF SUMMARY OF THE INVENTION

This invention provides an information processing apparatus including: a display unit; a computing device configured to acquire behavior history information based on behavior of a user, acquire predetermined behavior information from the behavior history information, and simultaneously display the behavior history information and the predetermined behavior information on the display unit.

This invention provides an information processing method of an information processing apparatus including a display unit, the method including: acquiring behavior history information based on behavior of a user; acquiring predetermined behavior information from the behavior history information; and simultaneously displaying the behavior history information based on the behavior of the user and the predetermined behavior information acquired from the behavior history information on the display unit.

This invention provides a non-transitory computer-readable recording medium storing a program for causing a computer configured to control an information processing apparatus including a display unit to execute a first acquisition function of acquiring behavior history information based on behavior of a user, a second acquisition function of acquiring predetermined behavior information from the behavior history information, and a display control function of simultaneously displaying the behavior history information acquired by the first acquisition function and the predetermined behavior information acquired by the second acquisition function on the display unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

Hereinafter, embodiments of the present invention will be described with reference to the drawings.

An information processing apparatus according to this embodiment is configured as a wearable information processing apparatus such as a smartwatch. The information processing apparatus includes various sensors such as an altimeter and acquires a log of daily behavior information of a user to transmit the accumulated log to a cooperating device such as a smartphone. The information processing apparatus holds a past maximum value (e.g., the highest altitude) in the log of the behavior information in the own apparatus and successively records the log of the behavior information for the past 24 hours in the own apparatus. In addition, the information processing apparatus displays the log of the behavior information for the past 24 hours on a display unit in the form of graph and also displays the past maximum value on the display unit. At this time, when a scale is set to the past maximum value, the log of the daily behavior information falls within a low-level range, which results in reduction in visibility and the like. Therefore, the past maximum value and the log of the daily behavior information are displayed once in a state in which visibility of the past maximum value is high, and then such display is switched to display in which visibility of the log of the daily behavior information is high.

With this, the user can intelligibly check the log of the daily behavior information while recognizing the user's past maximum value in the log of the behavior information.

Therefore, the information processing apparatus can provide desired information on behavior, such as a maximum value and a daily status, to the user.

[Configuration]

Figure 1:
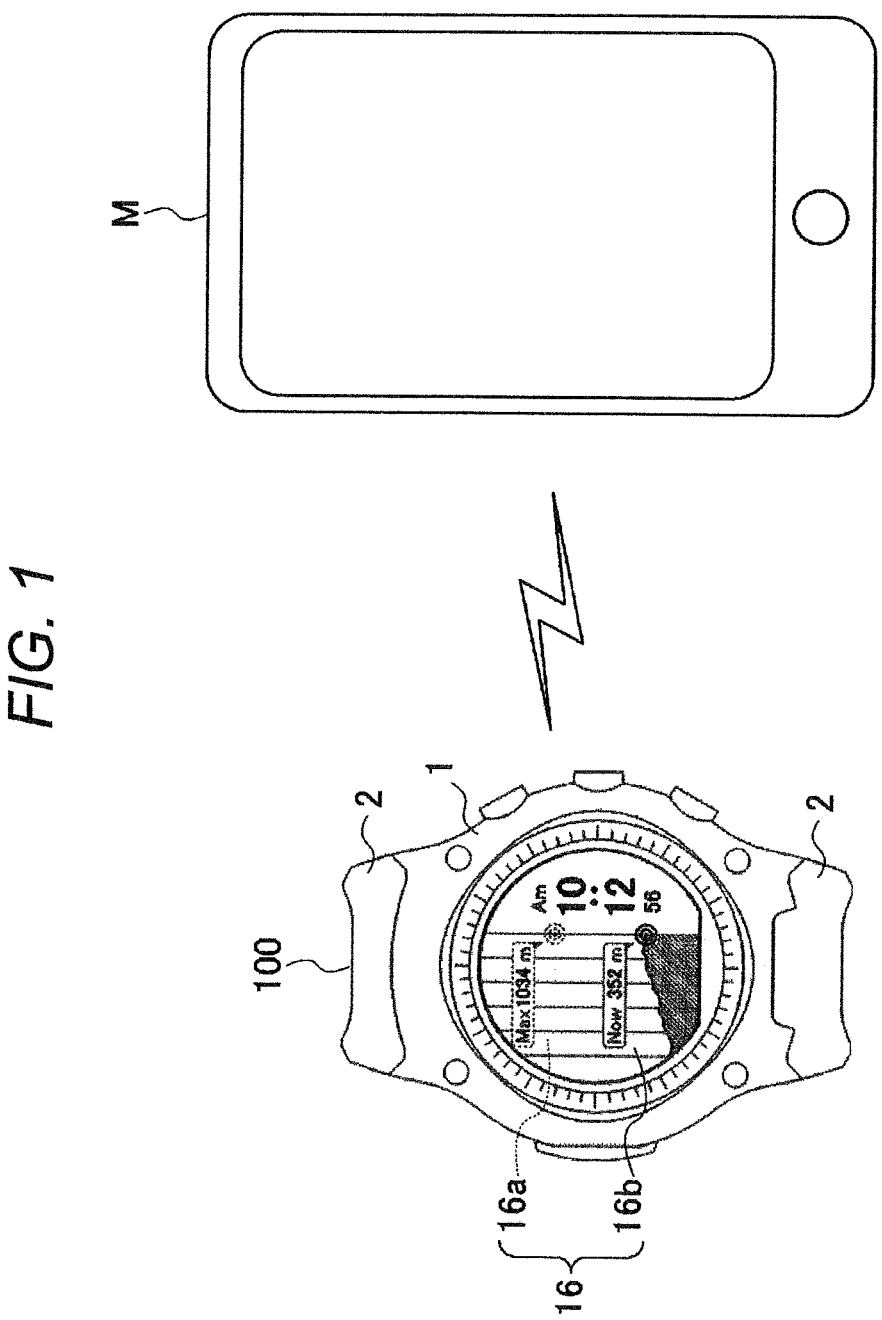
FIG. 1 is a schematic diagram of an information processing apparatus serving as an embodiment of an information processing apparatus of the present invention.

FIG. 1 is a schematic diagram of an information processing apparatus 100 serving as an embodiment of an information processing apparatus of the present invention.

As shown in FIG. 1, the information processing apparatus 100 in this embodiment has a shape of wristwatch and includes a main body part 1 and a band part 2. The information processing apparatus 100 also includes a display unit 16 in the main body part 1. The display unit 16 includes a first display unit 16a and a second display unit 16b and is specifically formed by overlaying the second display unit 16b on the first display unit 16a. Therefore, as necessary, the display unit 16 can perform display so that display on the first display unit 16a (e.g., display of various messages) and display on the second display unit 16b (e.g., clock display) are overlapped with each other. In this embodiment, the information processing apparatus 100 displays a graphed log of behavior information on the first display unit 16a as described below. Note that, although not shown in the drawings, a touchscreen serving as an operation unit 19 is provided on the second display unit 16b.

The information processing apparatus 100 is configured to be communicable with a cooperating device M such as a smartphone and can transmit the log of the behavior information and the like to the cooperating device M.

Figure 2:
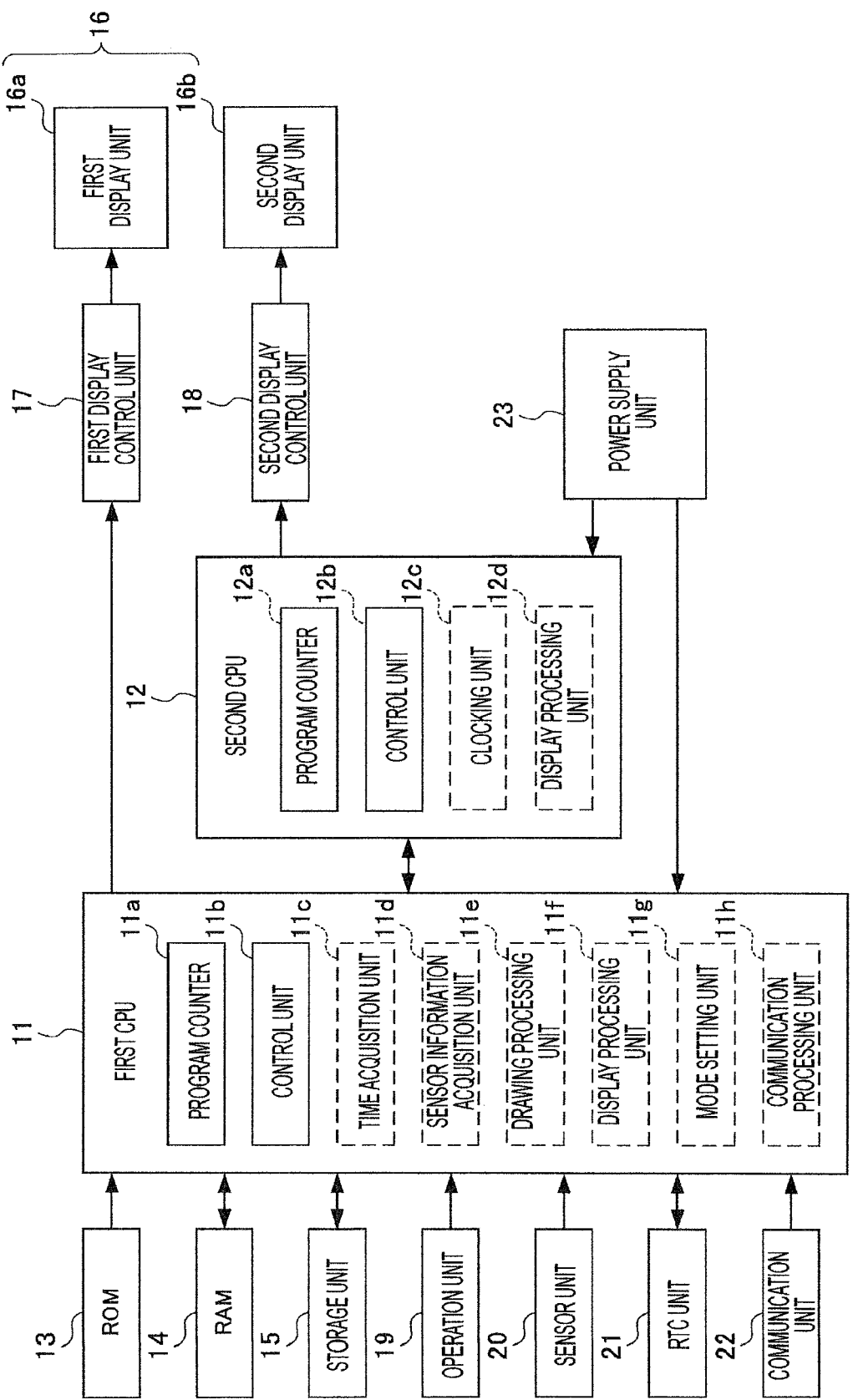
FIG. 2 is a block diagram showing a schematic configuration of the information processing apparatus in this embodiment.

FIG. 2 is a block diagram showing a schematic configuration of the information processing apparatus 100 in this embodiment.

As shown in FIG. 2, the information processing apparatus 100 includes a first CPU 11, a second CPU 12, a ROM 13, a RAM 14, a storage unit 15, the display unit 16 (first display unit 16a and second display unit 16b), a first display control unit 17 for controlling display on the first display unit 16a, a second display control unit 18 for controlling display on the second display unit 16b, the operation unit 19, a sensor unit 20, a real time clock (RTC) unit 21, a communication unit 22, a power supply unit 23, and the like.

The first CPU 11 performs various kinds of arithmetic processing and executes processing of an OS, thereby controlling a function similar to that of a smartphone in the information processing apparatus 100. In this embodiment, the first CPU 11 instructs the first display control unit 17 to perform display control of graphed display of the log of the behavior information of the user, display of messages related to reception of an email and weather information received via the communication unit 22, and the like, performs processing related to communication with the cooperating device M, and performs processing related to various functions provided as functions similar to those of a smartphone. Note that the first CPU 11 can display, on the first display unit 16a, a display content similar to a display content using a function of a wristwatch that the second CPU 12 displays on the second display unit 16b.

In this embodiment, the first CPU 11 acquires a time signal from the RTC unit 21 at a predetermined timing and outputs the acquired time signal to the second CPU 12. Further, the first CPU 11 instructs the first display control unit 17 to perform display control of time input from the second CPU 12.

Note that a specific configuration of the first CPU 11 will be described later.

The second CPU 12 executes processing of a certain program, thereby instructing the second display control unit 18 to perform display control and performing processing related to various functions provided as functions of a wristwatch. In this embodiment, the second CPU 12 calculates time on the basis of a time signal input from the first CPU 11 and instructs the second display control unit 18 to perform display control of, for example, display of time, day, or date. The second CPU 12 outputs the calculated time to the first CPU 11. The processing of the certain program executed by the second CPU 12 is simple operation, as compared with the processing of the OS executed by the first CPU 11, and therefore a processing load thereof is low and the processing of the certain program can be executed with low power consumption. Thus, performance of hardware required for the second CPU 12 may be lower than that of hardware required for the first CPU 11.

Note that a specific configuration of the second CPU 12 will be described later.

The ROM 13 is a memory from which data can be read out by the first CPU 11 and the second CPU 12. The ROM 13 stores various programs executed by the first CPU 11 and the second CPU 12 and initial setting data. For example, the ROM 13 stores programs such as a program of the OS executed by the first CPU 11, various programs executed under the control of the OS, and the certain program executed by the second CPU 12 (herein, a built-in program for realizing a function of a wristwatch).

The RAM 14 is a memory from/in which data can be read out/written by the first CPU 11 and the second CPU 12. The RAM 14 provides a working memory space to the first CPU 11 and the second CPU 12 and stores temporary working data. For example, the RAM 14 provides a system area and a work area when the first CPU 11 executes the OS and provides a storage area when the second CPU 12 executes the certain program.

The storage unit 15 is a nonvolatile memory from/in which data can be read out/written by the first CPU 11 and the second CPU 12. The storage unit 15 is, for example, a flash memory or an electrically erasable and programmable read only memory (EEPROM). The storage unit 15 stores various kinds of data (data of various setting contents and the like) generated in various functions similar to those of a smartphone, a function of a wristwatch, and the like. For example, the storage unit 15 stores data of a log of behavior information acquired by the sensor unit 20, data of a maximum value (past maximum value) in the log of the behavior information for the past predetermined period (one year, whole past period, or the like).

The display unit 16 includes the first display unit 16a and the second display unit 16b as described above.

The first display unit 16a is made up of an active-matrix liquid crystal display device such as a TFT color liquid crystal panel including a backlight and displays various kinds of information on a display screen under the control of the first display control unit 17 described below.

The first display control unit 17 performs control to generate display data and display the display data on the display screen of the first display unit 16a.

In this embodiment, for example, in response to a display instruction from the first CPU 11, the first display control unit 17 generates display data of a graphed log of behavior information and display data of messages related to reception of an email and weather information and outputs the display data from the first display unit 16a.

The second display unit 16b is made up of a polymer network (PN) liquid crystal panel (herein, passive-matrix liquid crystal display device) through which light can wholly or partially transmit and displays (herein, segment display) various kinds of information on a display screen under the control of the second display control unit 18 described below.

In this embodiment, as shown in FIG. 1, the PN liquid crystal panel serving as the second display unit 16b is overlaid on the display screen of the TFT color liquid crystal panel serving as the first display unit 16a described above. In the PN liquid crystal panel, liquid crystal molecules are irregularly arranged in a part to which no potential is applied, and therefore light is reflected. That is, in the part to which no potential is applied, display is performed by the PN liquid crystal panel. Meanwhile, in a part to which a potential is applied, liquid crystal molecules are arrayed to be perpendicular to the display screen, and therefore light can be transmitted. That is, in the part to which a potential is applied, light from the above TFT color liquid crystal panel can be transmitted, and therefore display by the TFT color liquid crystal panel can be visually recognized via the PN liquid crystal panel. In other words, in the display unit 16 in this embodiment, display by the first display unit 16a and display by the second display unit 16b can be displayed so as to be overlapped with each other.

The second display control unit 18 performs control to generate display data and display the display data on the display screen of the second display unit 16b.

In this embodiment, for example, in response to a display instruction from the second CPU 12, the second display control unit 18 generates display data of a time image and outputs the display data from the second display unit 16b.

The operation unit 19 is a capacitive touchscreen provided on the display screen of the second display unit 16b. The operation unit 19 detects a touch operation position and an operation content by a user on the touchscreen, generates a signal according to the operation, and outputs the signal as an input signal to the first CPU 11.

The sensor unit 20 includes various sensors such as a geomagnetic sensor, a gyro sensor, a three-axis acceleration sensor, an air pressure sensor, a temperature sensor, a biosensor (sensor of heartbeat, blood pressure, or the like), and a position sensor using a global positioning system (GPS) or the like. In this embodiment, detection signals of the sensor unit 20 are output to the first CPU 11 at predetermined time intervals (every minute, every ten minutes, or the like). Note that the detection signals of the sensor unit 20 may also be output to the second CPU 12, and information based on the detection signals of those sensors may be displayed as a part of a function of a wristwatch.

The RTC unit 21 includes an oscillation element such as a crystal oscillator and continuously counts time by receiving power supply from the power supply unit 23 or power supply from an auxiliary power supply (e.g., primary cell) also while a power supply of the information processing apparatus 100 is not on. In this embodiment, the RTC unit 21 outputs a time signal indicating the counted time to the first CPU 11. Note that the time signal of the RTC unit 21 may be output to the second CPU 12.

The communication unit 22 has a wireless communication function, such as Bluetooth (registered trademark), Bluetooth Low Energy (BLE) (trademark), or Wireless Fidelity (Wi-Fi), and communicates with the cooperating device M such as a smartphone.

The power supply unit 23 supplies power related to operation of the information processing apparatus 100 at a predetermined voltage. The power supply unit 23 includes, for example, batteries using various methods (lithium battery, nickel-hydrogen battery, and the like). In this embodiment, power is supplied from the power supply unit 23 to the first CPU 11 and the second CPU 12.

The power supply unit 23 detects a remaining battery capacity and outputs a signal indicating the detected remaining battery capacity to the first CPU 11.

The specific configurations of the first CPU 11 and the second CPU 12 will be described.

As shown in FIG. 2, the first CPU 11 includes a program counter 11a and a control unit 11b as a hardware configuration. The first CPU 11 executes the program of the OS or various programs (display control processing described below and the like) to configure a time acquisition unit 11c, a sensor information acquisition unit 11d, a drawing processing unit 11e, a display processing unit 11f, a mode setting unit 11g, and a communication processing unit 11h.

The program counter 11a is a register provided inside the first CPU 11 and stores an address of the RAM 14 in which a program to be subsequently executed is stored.

The control unit 11b controls operation for executing a program in the first CPU 11, such as an operation timing and an operation content in each unit (decoding circuit, operation circuit, and the like (not shown)) inside the first CPU 11. The control unit 11b successively writes, in the program counter 11a, an address of the RAM 14 in which the program to be subsequently executed is stored.

The time acquisition unit 11c acquires a time signal from the RTC unit 21 at a predetermined timing (e.g., at the time of start or at the time of adjustment of time). Then, the time acquisition unit 11c outputs the acquired time signal to the second CPU 12. Further, the time acquisition unit 11c acquires time calculated and output by the second CPU 12.

The sensor information acquisition unit 11d acquires detection signals of various sensors included in the sensor unit 20. For example, the sensor information acquisition unit 11d acquires an air pressure detected by the air pressure sensor. Based on the acquired air pressure, the sensor information acquisition unit 11d calculates an altitude at which the information processing apparatus 100 positions. Similarly, the sensor information acquisition unit 11d acquires a position detected by the position sensor, a heart rate or blood pressure detected by the biosensor, a three-axis acceleration detected by the three-axis acceleration sensor, and the like and successively calculates various kinds of data which can be calculated on the basis of the above information (e.g., speed which can be calculated on the basis of the position).

Then, the sensor information acquisition unit 11d accumulates and stores, in the storage unit 15, the acquired data of the detection results in the various sensors and the various kinds of calculated data.

The sensor information acquisition unit 11d determines, every predetermined time period (e.g., 24 hours), whether or not the past maximum value in the log of the behavior information held by the storage unit 15 has been surpassed and rewrites data of the past maximum value in the case where the past maximum value has been surpassed. Note that, in the case where an instruction input to determine whether or not the past maximum value in the log of the behavior information has been surpassed is performed by the user, the sensor information acquisition unit 11d determines whether or not the past maximum value in the log of the behavior information has been surpassed with reference to currently accumulated data of the log of the behavior information for the past 24 hours, and rewrites data of the past maximum value in the case where the past maximum value has been surpassed. In the case where an instruction input to reset the past maximum value is performed by the user, the sensor information acquisition unit 11d rewrites the data of the past maximum value to a maximum value in the currently accumulated data of the log of the behavior information for the past 24 hours.

The drawing processing unit 11e configures a display screen for displaying the log of the behavior information of the user (log of an altitude at which the user achieves, a running speed, calorie consumption, a heart rate, a blood pressure, the number of steps, and the like) which is acquired by the sensor information acquisition unit 11d and is accumulated and stored in the storage unit 15. In this embodiment, the drawing processing unit 11e configures a display screen for mainly displaying the past maximum value in the log of the behavior information of the user (hereinafter, referred to as "maximum value display screen"), a display screen for mainly displaying a status for the past 24 hours in the log of the behavior information of the user (hereinafter, referred to as "status display screen"), and a display screen for making a transition between the maximum value display screen and the status display screen (hereinafter, referred to as "transition screen").

However, the transition screen is not necessarily displayed in the case where transition between the maximum value display screen and the status display screen is performed. For example, in the case where the maximum value in the log of the behavior information of the user is close to recorded values for the past 24 hours, the transition screen is not displayed, i.e., it is possible to perform setting so that the transition screen is not displayed depending on a condition. For example, in this embodiment, the drawing processing unit 11e does not configure the transition screen in the case where the past maximum value in the log of the behavior information of the user is predetermined times (e.g., twice) or less as much as a current value in the log of the behavior information of the user. Further, the drawing processing unit 11e does not configure the transition screen in the case where the past maximum value in the log of the behavior information of the user is less than the maximum value for the past 24 hours (i.e., in the case where the maximum value exceeds the past maximum value within the past 24 hours but the past maximum value has not yet been updated). In the case where the transition screen is not configured, the status display screen serving as the maximum value display screen is continuously displayed from the first.

Figure 3A:
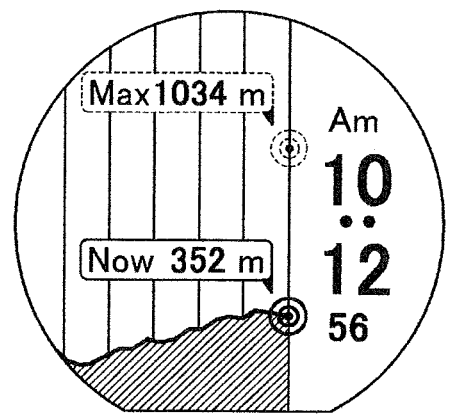
FIG. 3A is a schematic diagram showing a display screen example configured by a drawing processing unit, which is a schematic diagram showing a maximum value display screen.
Figure 3B:
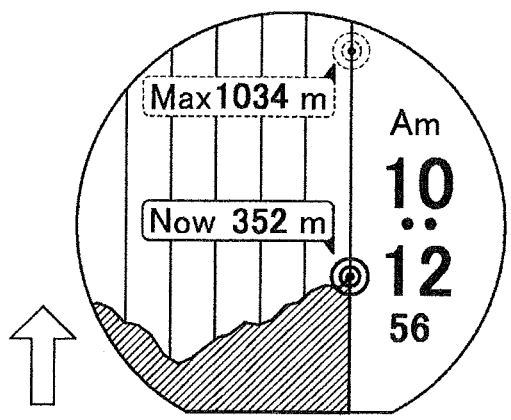
FIG. 3B is a schematic diagram showing a display screen example configured by the drawing processing unit, which is a schematic diagram showing a transition screen.
Figure 3C:
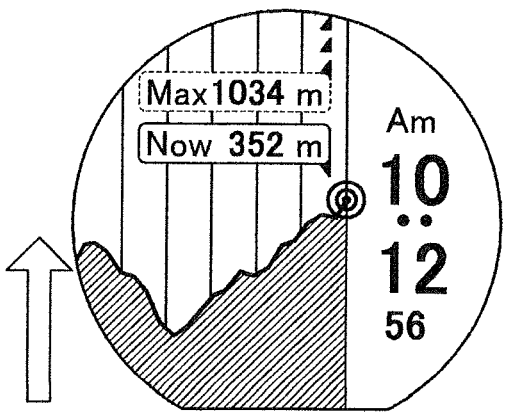
FIG. 3C is a schematic diagram showing a display screen example configured by the drawing processing unit, which is a schematic diagram showing a status display screen.

FIGS. 3A to 3C show schematic diagrams showing display screen examples configured by the drawing processing unit 11e. FIG. 3A is a schematic diagram showing the maximum value display screen, FIG. 3B is a schematic diagram showing the transition screen, and FIG. 3C is a schematic diagram showing the status display screen. Note that FIG. 3 shows an example where the altitude at which the user achieves is displayed as the log of the behavior information of the user.

As shown in FIG. 3A, in the maximum value display screen, time is displayed in a right end region of the display screen (e.g., one-third region on a right side in a width of the display screen), and, in a remaining region of the display screen, a mark and a numerical value indicating the past maximum value (highest altitude "Max") in the log of the behavior information of the user are shown between the center and an upper end in a height of the display screen. That is, in the maximum value display screen, a display position of the past maximum value is identified and displayed by the mark indicating the past maximum value, and the numerical value of the past maximum value is shown in an accompanying region displayed in the vicinity of a display position of the mark indicating the past maximum value (rectangular region in which "Max 1034 m" is displayed in FIG. 3A). Note that, at this time, a lower end of the display screen is a reference line having an altitude of zero.

In the maximum value display screen, the log of the behavior information for the past 24 hours (history of the altitude for the past 24 hours) is displayed at a height based on an actual ratio of each value to the past maximum value from the lower end of the display screen (reference line having the altitude of zero). In the log of the behavior information for the past 24 hours, numerical values are indicated by a line graph, and predetermined painting (e.g., a pattern like a mountain in the case where the altitude is displayed) is performed in a region from the lower end of the display screen to the line. In the log of the behavior information for the past 24 hours, a left side in a width direction of the display screen indicates past, and a right end of the line indicates a current status. Regarding the current status, a mark and a numerical value indicating the current status (current altitude "Now") are shown in the right end of the line. That is, in the maximum value display screen, a display position of the current status is identified and displayed by the mark indicating the current status, and the numerical value of the current status is shown in an accompanying region displayed in the vicinity of a display position of the mark indicating the current status (rectangular region in which "Now 352 m" is displayed in FIG. 3A).

With this display, it is possible to show the past maximum value in the log of the behavior information of the user so that the past maximum value can be visually recognized with ease. Further, because the marks and the numerical values of the current status and the past maximum value are shown, it is possible to identify and highlight the current status and the past maximum value, which is more intelligible for the user.

As shown in FIG. 3B, in the transition screen, a scale in the height direction of the display screen is enlarged and the past maximum value moves upward in the display screen, and coordinates of the line indicating the log of the behavior information for the past 24 hours are changed so that the mark indicating the current status positions in the vicinity of the center in the height of the display screen. Note that the transition screen is displayed after the maximum value display screen is displayed for a predetermined time period (e.g., one second), and, in the transition screen, the above change is continuously displayed from the maximum value display screen by animation.

With this display, it is possible to intelligibly show, to the user, that the screen is changed from the maximum value display screen and how the screen is changed.

As shown in FIG. 3C, in the status display screen, as well as in the maximum value display screen, the time is displayed in the right end region of the display screen. Meanwhile, in the status display screen, in the remaining region of the display screen, the past maximum value (highest altitude "Max") in the log of the behavior information of the user moves upward in the display screen through the transition screen, and, in the case where the numerical value of the past maximum value is large, the past maximum value moves to a position exceeding the upper end of the display screen (i.e., the mark indicating the past maximum value is deleted from the display screen). However, even in the case where the mark indicating the past maximum value is deleted from the display screen, the numerical value indicating the past maximum value is displayed at a position immediately above the accompanying region of the current status (current altitude "Now"). That is, in the status display screen, even in the case where the mark indicating the past maximum value is deleted from the display screen, the numerical value of the past maximum value (notification information) is notified by additionally displaying the accompanying region of the past maximum value on the display screen. Note that, at this time, an arrow indicating that the mark indicating the past maximum value exceeds the upper end of the display screen is displayed to be directed upward from the numerical value indicating the past maximum value.

With this display, it is possible to display a status for the past 24 hours in the log of the behavior information of the user so that the status can be visually recognized with ease.

The display processing unit 11f outputs, to the first display control unit 17, an instruction signal for display control to display information and a processing result acquired by each function unit. For example, the display processing unit 11f outputs, to the first display control unit 17, an instruction signal for display control to display the display screen (i.e., the maximum value display screen, the transition screen, the status display screen, or the like) showing the log of the behavior information generated by the drawing processing unit 11e.

The mode setting unit 11g sets any one of a plurality of display modes for displaying information in the information processing apparatus 100 in accordance with setting by the user or a state of the information processing apparatus 100. In this embodiment, an interactive mode (normal mode) in which quality of a display content is prioritized and an ambient mode (save mode) in which low power consumption processing is prioritized are prepared in the information processing apparatus 100. In the interactive mode, data of detection results in the various sensors is always (e.g., every minute) acquired by the sensor information acquisition unit 11d, and the drawing processing unit 11e successively updates the display screen (status display screen) with a frequency corresponding thereto. Meanwhile, in the ambient mode, data of detection results in the various sensors are intermittently (e.g., every ten minutes) acquired by the sensor information acquisition unit 11d, and the drawing processing unit 11e successively updates the display screen (status display screen) with a frequency corresponding thereto.

The communication processing unit 11h outputs information received via the communication unit 22 to each function unit corresponding to the information and transmits information transmitted from each function unit to another electronic device via the communication unit 22. For example, the communication processing unit 11h transmits the data of the log of the behavior information stored in the storage unit 15 to the cooperating device M via the communication unit 22 every predetermined time period (e.g., every 24 hours).

As shown in FIG. 2, the second CPU 12 includes a program counter 12a and a control unit 12b as a hardware configuration. The second CPU 12 executes a certain program to configure a clocking unit 12c and a display processing unit 12d.

The program counter 12a is a register provided inside the second CPU 12 and stores an address of the RAM 14 in which a program to be subsequently executed is stored.

The control unit 12b controls operation for executing a program in the second CPU 12, such as an operation timing and an operation content in each unit (decoding circuit, operation circuit, and the like (not shown)) inside the second CPU 12. The control unit 12b successively writes, in the program counter 12a, an address of the RAM 14 in which the program to be subsequently executed is stored.

The clocking unit 12c calculates time on the basis of a time signal input from the first CPU 11. Then, the clocking unit 12c outputs the calculated time to the first CPU 11.

In the case where the second display unit 16b is set to display the time, the display processing unit 12d outputs, to the second display control unit 18, an instruction signal for display control to display a processing result in the clocking unit 12c.

[Operation]

Operation will be described.

Figure 4:
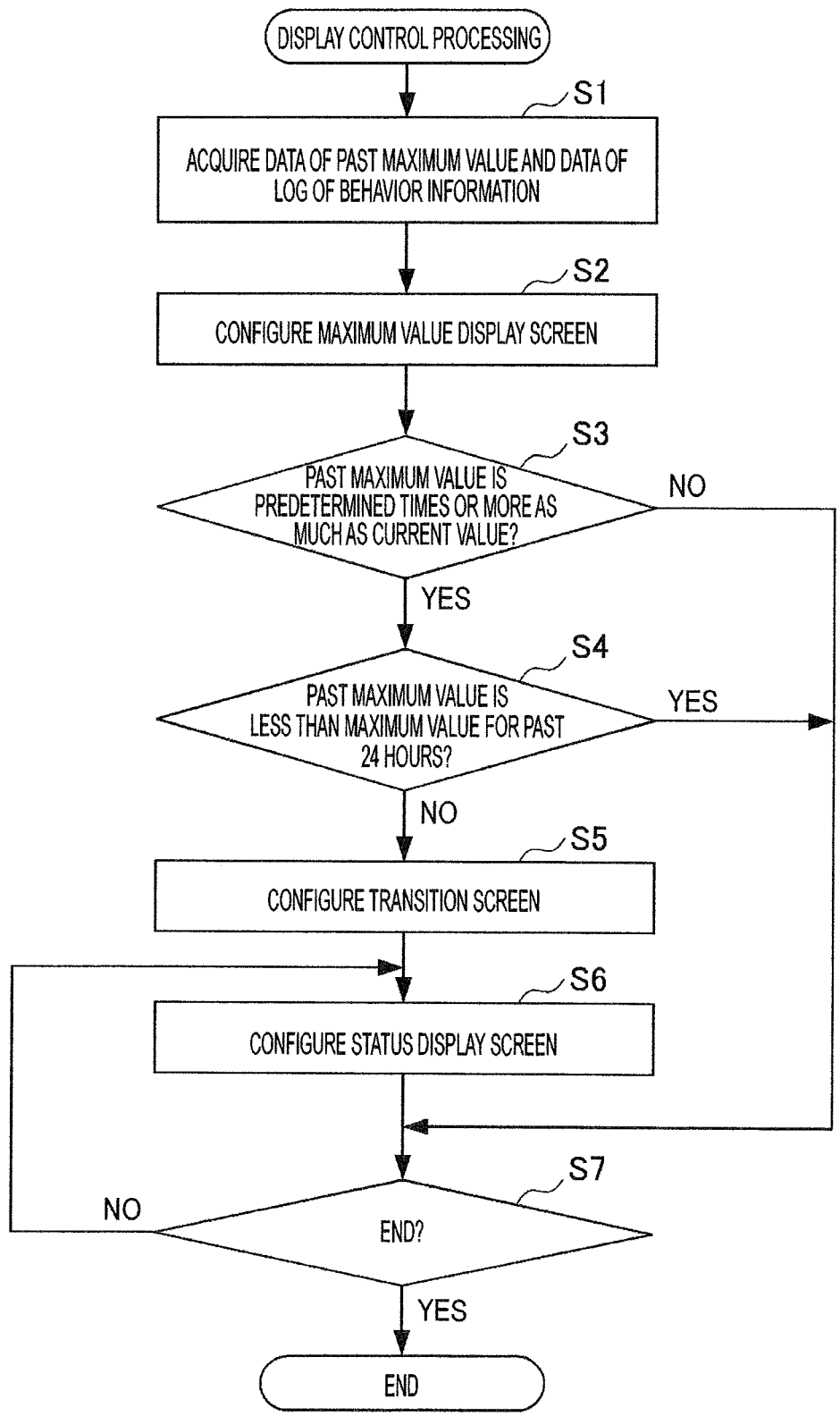
FIG. 4 is a flowchart showing a flow of display control processing executed by an information processing apparatus.

FIG. 4 is a flowchart showing a flow of the display control processing executed by the information processing apparatus 100.

The display control processing is started when a user inputs an instruction to start the display control processing (an instruction to display a graph of the log of the behavior information).

In step S1, the drawing processing unit 11e acquires data of a past maximum value of behavior information of the user and data of a log of the behavior information for the past 24 hours, which are stored in the storage unit 15.

In step S2, the drawing processing unit 11e configures a maximum value display screen by using the acquired data of the past maximum value and the acquired data of the log of the behavior information for the past 24 hours (see FIG. 3A). The maximum value display screen configured in step S2 is displayed on the first display unit 16a when an instruction signal for display control is output to the first display control unit 17 by the display processing unit 11f.

In step S3, the drawing processing unit 11e determines whether or not the past maximum value in the log of the behavior information of the user is predetermined times (e.g., twice) or more as much as a current value in the log of the behavior information of the user.

In the case where the past maximum value in the log of the behavior information of the user is predetermined times or more as much as the current value in the log of the behavior information of the user, determination is YES in step S3, and the processing proceeds to step S4.

Meanwhile, in the case where the past maximum value in the log of the behavior information of the user is not predetermined times or more as much as the current value in the log of the behavior information of the user, determination is NO in step S3, and the processing proceeds to step S7.

In step S4, the drawing processing unit 11e determines whether or not the past maximum value in the log of the behavior information of the user is less than the maximum value for the past 24 hours.

In the case where the past maximum value in the log of the behavior information of the user is not less than the maximum value for the past 24 hours, determination is NO in step S4, and the processing proceeds to step S5.

Meanwhile, in the case where the past maximum value in the log of the behavior information of the user is less than the maximum value for the past 24 hours, determination is YES in step S4, and the processing proceeds to step S7.

In step S5, the drawing processing unit 11e configures a transition screen (see FIG. 3B). The transition screen configured in step S5 is displayed on the first display unit 16a when an instruction signal for display control is output to the first display control unit 17 by the display processing unit 11f. Note that, in this embodiment, the transition screen is displayed as a display screen of animation that continuously changes.

In step S6, the drawing processing unit 11e configures a status display screen (see FIG. 3C).

In step S7, the drawing processing unit 11e determines whether or not an instruction input to terminate the display control processing has been performed.

In the case where the instruction input to terminate the display control processing has not been performed, determination is NO in step S7, and the processing proceeds to step S6.

Meanwhile, in the case where the instruction input to terminate the display control processing has been performed, determination is YES in step S7, and the display control processing is terminated.

With this processing, the user can intelligibly check the log of the daily behavior information while recognizing the user's past maximum value in the log of the behavior information.

Therefore, the information processing apparatus can provide desired information on behavior, such as a maximum value and a daily status, to the user.

Modification Example 1

In the above embodiment, in the case where the status display screen is displayed, it is possible to identify and display the current status surpassing the past maximum value.

Figure 5:
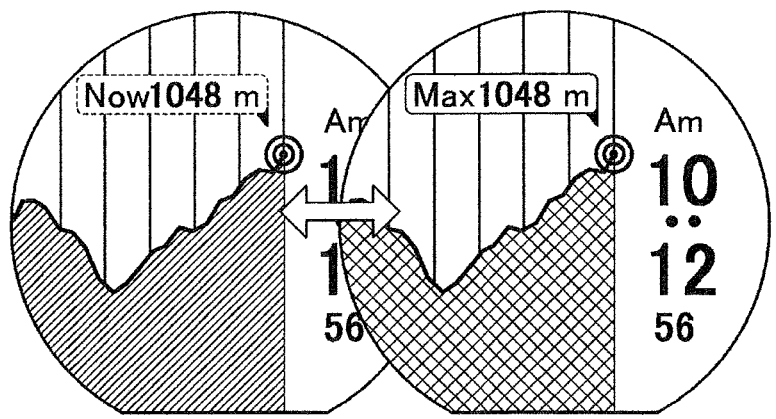
FIG. 5 is a schematic diagram showing an example of a status display screen that identifies and displays a current status surpassing a past maximum value.

FIG. 5 is a schematic diagram showing an example of the status display screen that identifies and displays the current status surpassing the past maximum value. Note that FIG. 5 shows an example where a graph of an altitude is displayed in the case where the user climbs a mountain.

As shown in FIG. 5, in the case where the current status (altitude 1048 m) in the log of the behavior information of the user surpasses the past maximum value, the drawing processing unit 11e configures a status display screen that displays a state in which the mark and the numerical value indicating the current status (current altitude "Now") are displayed as in a status display screen shown on a left side of FIG. 5 and a state in which the mark and numerical value indicating the past maximum value (highest altitude "Max") are displayed as in a status display screen shown on a right side of FIG. 5 so that the above states are alternately switched. Further, in a state in which the past maximum value is indicated as shown on the right side of FIG. 5, the drawing processing unit 11e identifies and displays surpassing of the past maximum value by changing display color to a predetermined color (e.g., by changing colors of the line graph, the mark indicating the past maximum value, and the like to red).

With this, it is possible to intelligibly show, to the user, that the current status surpasses the past maximum value.

Modification Example 2

In the above embodiment, in the case where the status display screen is displayed and the current status is close to the past maximum value, it is possible to change a display form so as to prevent display of the numerical value indicating the current status and display of the numerical value indicating the past maximum value from interfering with each other.

Figure 6:
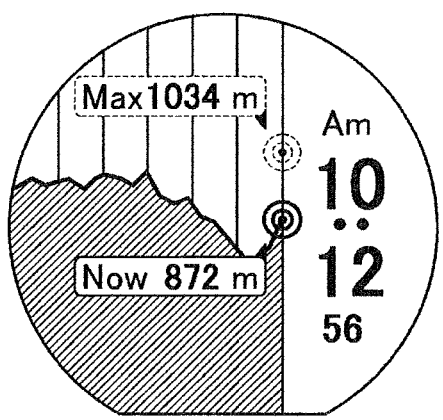
FIG. 6 is a schematic diagram showing an example of a status display screen displayed in a status in which a current status is close to a past maximum value.

FIG. 6 is a schematic diagram showing an example of the status display screen displayed in a status in which the current status is close to the past maximum value. FIG. 6 shows an example where a graph of an altitude is displayed in the case where the user climbs a mountain.

In a status in which the current status is not close to the past maximum value, the numerical value indicating the current status, as well as the numerical value indicating the past maximum value, is displayed in the form of balloon on upper left above the mark indicating the current status.

Meanwhile, in the case where, in a status in which the current status is close to the past maximum value, the numerical value indicating the current status and the numerical value indicating the past maximum value are displayed as described above, those numerical values interfere with each other in some cases. Therefore, the numerical value indicating the current status is displayed in the form of balloon on lower left below the mark indicating the current status.

With this, in various statuses, it is possible to display the numerical value indicating the current status so that the user can visually recognize the numerical value with ease.

Modification Example 3

In the above embodiment, in the case where a graph of the log of the behavior information of the user is displayed, it is possible to interpolate display of a region in which data of the log of the behavior information is not acquired (hereinafter, referred to as "deficient area").

Figure 7A:
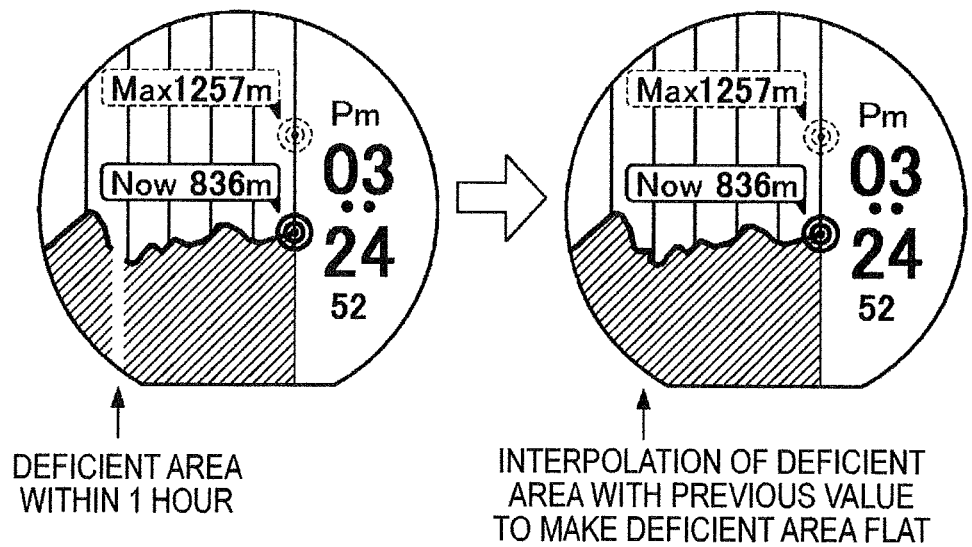
FIG. 7A is a schematic diagram showing a state in which a deficient area in a log of behavior information of a user is interpolated, which is a schematic diagram showing the case where the deficient area is within a predetermined time period.
Figure 7B:
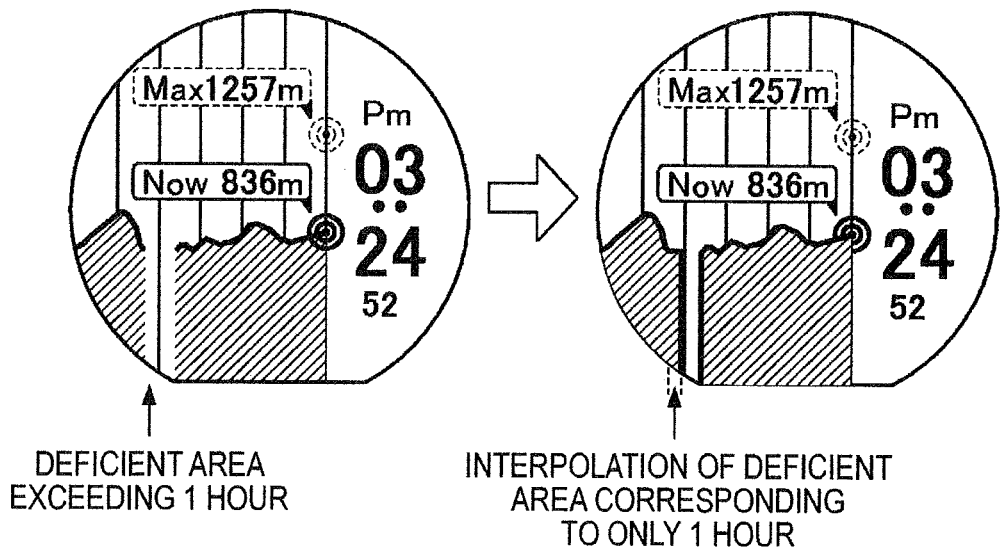
FIG. 7B is a schematic diagram showing a state in which a deficient area in a log of behavior information of a user is interpolated, which is a schematic diagram showing the case where the deficient area exceeds a predetermined time period.

FIGS. 7A and 7B are schematic diagrams showing a state in which a deficient area in the log of the behavior information of the user is interpolated. FIG. 7A is a schematic diagram showing the case where the deficient area is within a predetermined time period (herein, within one hour), and FIG. 7B is a schematic diagram showing the case where the deficient area exceeds the predetermined time period.

In the case where the deficient area in the log of the behavior information of the user is within the predetermined time period, as shown in FIG. 7A, the drawing processing unit 11e interpolates the deficient area with a previous value in the log of the behavior information so as to make the deficient area flat.

With this, there is no deficient area in the graph in appearance.

Meanwhile, in the case where the deficient area in the log of the behavior information of the user exceeds the predetermined time period, as shown in FIG. 7B, the drawing processing unit 11e interpolates an area corresponding to a predetermined time period from the beginning of the deficient area with a previous value in the log of the behavior information so as to make the area flat.

With this, only a deficient area exceeding the predetermined time period is deficient in the graph in appearance.

With this processing, in the case where there is a deficient area in the log of the behavior information of the user, regarding a deficient part within a predetermined time period, the deficient part is interpolated so as not to be recognized, and, regarding a deficient part exceeding the predetermined time period, it is possible to prevent an interpolated area (flat area) from being too conspicuous due to excessive interpolation.

Modification Example 4

In the above embodiment, there has been described the case where, in the status display screen, the mark indicating the current status positions in the vicinity of the center in the height of the display screen, but the embodiment is not limited thereto.

For example, in the case of displaying a graph of an altitude on a day in which the user climbs a mountain from a flatland to a place where elevation is high, a range of the altitude to be displayed is large, and therefore a maximum value for the past 24 hours exceeds the upper end of the display screen. With such a display form, it is difficult to grasp the whole status.

In view of this, the drawing processing unit 11e can determine the scale of the height of the status display screen on the basis of an amplitude in the log of the behavior information of the user for the past 24 hours.

Figure 8A:
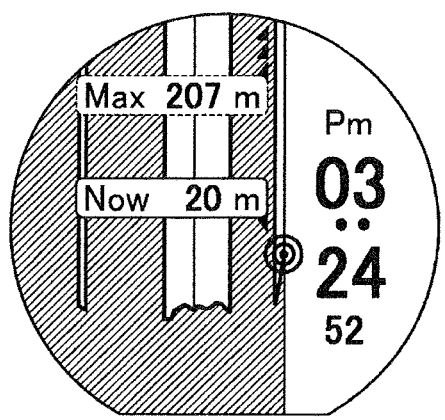
FIG. 8A is a schematic diagram of a display screen example showing a state in which a scale of a height of a display screen is adjusted on the basis of an amplitude in a log of behavior information of a user for the past 24 hours, which shows the case where adjustment is not performed.
Figure 8B:
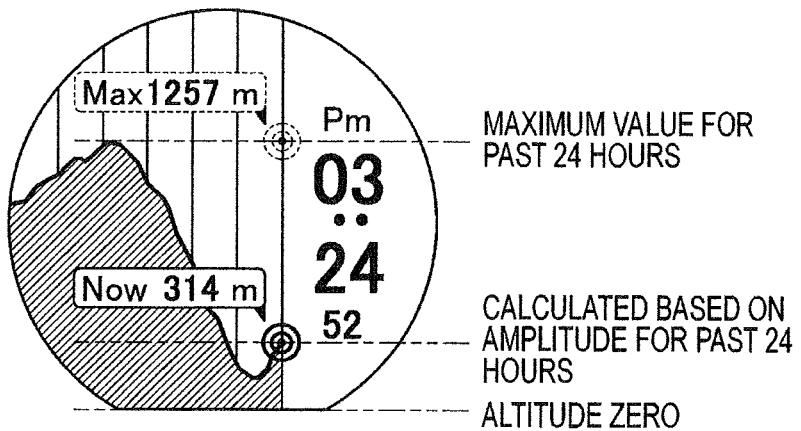
FIG. 8B is a schematic diagram of a display screen example showing a state in which a scale of a height of a display screen is adjusted on the basis of an amplitude in a log of behavior information of a user for the past 24 hours, which shows the case where adjustment is performed.

FIGS. 8A and 8B are schematic diagrams of a display screen example showing a state in which the scale of the height of the display screen is adjusted on the basis of the amplitude in the log of the behavior information of the user for the past 24 hours. FIG. 8A shows the case where adjustment is not performed, and FIG. 8B shows the case where adjustment is performed.

As shown in FIG. 8A, in the case where the mark indicating the current status is displayed to position in the vicinity of the center in the height of the display screen and the amplitude in the log of the behavior information of the user is large, the maximum value for the past 24 hours exceeds the upper end of the display screen. With such a display form, it is difficult to grasp the whole status.

Meanwhile, in the case where the drawing processing unit 11e makes adjustment so that the scale of the height of the status display screen is determined on the basis of the amplitude in the log of the behavior information of the user for the past 24 hours, the maximum value in the log of the behavior information of the user for the past 24 hours is displayed at a position that is equal to or lower than the upper end in the height of the display screen, and the mark indicating the current status is displayed at a position between the position and the lower end of the display screen.

With this, also in the case where the amplitude in the log of the behavior information of the user is large, it is possible to achieve a display form with which the whole status can be easily grasped.

Modification Example 5

In the above embodiment, in the case where the past maximum value is included in the log of the behavior information of the user for the past 24 hours, the mark and the numerical value indicating the past maximum value may be displayed at a position of the past maximum value in the line.

Figure 9:
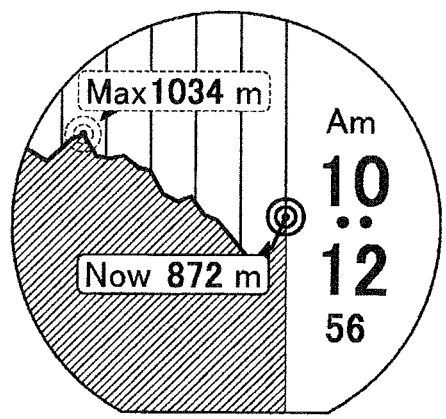
FIG. 9 is a schematic diagram showing an example of a display screen in which a mark and a numerical value indicating a past maximum value are displayed at a position of a past maximum value in a line.

FIG. 9 is a schematic diagram showing an example of the display screen in which the mark and the numerical value indicating the past maximum value are displayed at the position of the past maximum value in the line.

In the case of display shown in FIG. 9, it is possible to intelligibly show, to the user, that the past maximum value is included in the log of the behavior information of the user for the past 24 hours.

Note that whether to perform such display can be determined by the drawing processing unit 11e on the basis of an instruction from the user or the like, and, in the case where the drawing processing unit 11e determines to perform such display, the display can be executed. That is, even in the case where the past maximum value is included in the log of the behavior information of the user for the past 24 hours, the mark and the numerical value indicating the past maximum value may be displayed on the same axis (vertical axis in the right end of the line) as the mark and the numerical value indicating the current status, as in FIG. 3C or the like.

Note that the mark and the numerical value indicating the past maximum value can be displayed not only on the same axis (vertical axis in the right end of the line) as the mark and the numerical value indicating the current status, but also, for example, at the position of the past maximum value in the line.

The information processing apparatus 100 configured as described above includes the first display unit 16a and the drawing processing unit 11e.

The drawing processing unit 11e acquires behavior history information based on behavior of a user.

The drawing processing unit 11e acquires predetermined behavior information (past maximum value) from the behavior history information.

The drawing processing unit 11e simultaneously displays the acquired behavior history information and the acquired predetermined behavior information on the first display unit 16a.

With this, the user can intelligibly check daily behavior history information while recognizing the predetermined behavior information in the behavior history information.

Therefore, the information processing apparatus can provide desired information on behavior to the user.

The drawing processing unit 11e simultaneously displays current behavior information, the behavior history information, and the predetermined behavior information on the first display unit 16a in a state in which the current behavior information in the behavior history information is continuously added to the behavior history information.

With this, it is possible to intelligibly display the current behavior information, the behavior history information, and the predetermined behavior information.

The drawing processing unit 11e displays the current behavior information and displays the current behavior information and the predetermined behavior information on the first display unit 16a so that the current behavior information and the predetermined behavior information are placed on the same axis.

With this, it is possible to display a relationship between the current behavior information and the predetermined behavior information more intelligibly.

The drawing processing unit 11e highlights the current behavior information and the predetermined behavior information by identifying and displaying display positions of the current behavior information and the predetermined behavior information.

With this, it is possible to display contents of the current behavior information and the predetermined behavior information more intelligibly.

The drawing processing unit 11e determines whether to acquire the predetermined behavior information from the behavior history information displayed by the first display unit 16a.

In the case where the drawing processing unit 11e determines to acquire the predetermined behavior information from the behavior history information displayed by the first display unit 16a, the drawing processing unit 11e distinguishably displays a part corresponding to the predetermined behavior information in the behavior history information.

With this, in the case where the predetermined behavior information is acquired from the displayed behavior history information, it is possible to intelligibly display the part corresponding to the predetermined behavior information.

The drawing processing unit 11e determines whether to acquire the predetermined behavior information from the behavior history information displayed by the first display unit 16a.

In the case where the drawing processing unit 11e determines to acquire the predetermined behavior information from the behavior history information displayed by the first display unit 16a, the drawing processing unit 11e displays the current behavior information and the predetermined behavior information on the first display unit 16a so that the current behavior information and the predetermined behavior information are placed on the same axis.

With this, in the case where the predetermined behavior information is acquired from the displayed behavior history information, it is possible to display the relationship between the current behavior information and the predetermined behavior information more intelligibly.

The drawing processing unit 11e determines a first coordinate axis on the basis of the behavior history information and the predetermined behavior information so that the behavior history information and the predetermined behavior information are simultaneously displayed on the first display unit 16a.

The drawing processing unit 11e displays the behavior history information and the predetermined behavior information on the first display unit 16a in a state in which the behavior history information and the predetermined behavior information are placed with respect to the determined first coordinate axis.

With this, the predetermined behavior information in the behavior history information is included in the display screen, and therefore it is possible to display the predetermined behavior information so that the predetermined behavior information can be visually recognized with ease.

The drawing processing unit 11e determines a second coordinate axis on the basis of the behavior history information so that a mark indicating the predetermined behavior information is not displayed on the first display unit 16a.

The drawing processing unit 11e acquires notification information on the predetermined behavior information (e.g., a numerical value of the past maximum value).

The drawing processing unit 11e places the behavior history information with respect to the determined second coordinate axis and displays the behavior history information on the first display unit 16a in a state in which the notification information is added.

With this, it is possible to intelligibly show that the predetermined behavior information is out of the display screen and the notification information while mainly displaying the behavior history information.

The drawing processing unit 11e determines the first coordinate axis on the basis of the behavior history information and the predetermined behavior information so that the behavior history information and the predetermined behavior information are simultaneously displayed on the first display unit 16a.

The drawing processing unit 11e determines the second coordinate axis on the basis of the behavior history information so that a mark indicating the predetermined behavior information is not displayed on the first display unit 16a.

The drawing processing unit 11e acquires the notification information on the predetermined behavior information (e.g., a numerical value of the past maximum value).

The drawing processing unit 11e displays the behavior history information and the predetermined behavior information on the first display unit 16a in a state in which the behavior history information and the predetermined behavior information are placed with respect to the determined first coordinate axis and subsequently updates display on the first display unit 16a so that the behavior history information is placed with respect to the determined second coordinate axis and is displayed in a state in which the notification information is added.

With this, it is possible to intelligibly show, to the user, that a state of the display screen changes and the notification information.

In the case where a difference between the current behavior information and the predetermined behavior information is equal to or less than a value set in advance, the drawing processing unit 11e displays the behavior history information and the predetermined behavior information on the first display unit 16a so that the behavior history information and the predetermined behavior information are placed with respect to the determined first coordinate axis and then does not update display on the first display unit 16a.

With this, it is possible to prevent display for updating display on the first display unit 16a from being performed when such display is not necessary.

The drawing processing unit 11e displays accompanying regions in which respective contents of the current behavior information and the predetermined behavior information are displayed in the vicinity of the display positions of the current behavior information and the predetermined behavior information and changes at least one display position of the accompanying regions of the current behavior information and the predetermined behavior information to a position at which the one display position does not interfere with the other display position.

With this, in various statuses, it is possible to display the current behavior information and the predetermined behavior information so that the user can visually recognize the current behavior information and the predetermined behavior information with ease.

The information processing apparatus 100 includes the mode setting unit 11g.

The mode setting unit 11g sets any one of the normal mode in which quality of a display content is prioritized and the save mode in which low power consumption processing is prioritized.

The mode setting unit 11g reduces an acquisition frequency of behavior history information in the save mode, as compared with the normal mode.

With this, it is possible to select and prioritize quality of a display content or lowness of power consumption in the information processing apparatus 100 depending on the mode.

In the case where there is a deficient area in which the behavior history information is not acquired, the drawing processing unit 11e executes processing of interpolating the deficient area.

With this, it is possible to achieve a display form in which a deficiency in the behavior history information is inconspicuous.

The predetermined behavior information is the past highest altitude.

With this, in the case where an altitude is displayed as the behavior history information of the user, it is possible to intelligibly display the past highest altitude.

The drawing processing unit 11e highlights the current behavior information and the predetermined behavior information by displaying marks or numerical values indicating the current behavior information and the predetermined behavior information.

With this, it is possible to intelligibly display the positions of the current behavior information and the predetermined behavior information in the display screen and the contents thereof.

Note that the present invention is not limited to the above embodiments, and the present invention encompasses modifications, improvements, and the like within a scope in which an object of the present invention can be achieved. That is, the present invention is applicable to cases where various display targets are displayed by various devices as long as behavior history information based on behavior of a user can be acquired, predetermined behavior information can be acquired from the behavior history information, and the acquired behavior history information and the acquired predetermined behavior information can be simultaneously displayed.

In the above embodiment, there has been mainly described the case where a graph of an altitude is displayed as an example of behavior information of a user, but the present invention is not limited thereto. That is, it is possible to display graphs of, for example, a running speed, calorie consumption, a heart rate, a blood pressure, and the number of steps of the user, and it is also possible to display those graphs while switching the graphs.

In the above embodiment, the information processing apparatus 100 to which the present invention is applied has been described as a wearable information processing apparatus as an example, but is not particularly limited thereto.

For example, the present invention is applicable to general electronic devices having an information processing function. Specifically, for example, the present invention is applicable to a notebook personal computer, a printer, a television receiver, a video camera, a portable navigation device, a mobile phone, a smartphone, a portable game console, and the like.

In the above embodiment, the second display unit 16b has been described as a PN liquid crystal panel, but is not limited thereto. The second display unit 16b may be any display device as long as the display device allows light to transmit therethrough in accordance with a potential applied to the liquid crystal. For example, a polymer dispersed (PD) liquid crystal panel other than PN, an organic electro-luminescence (EL) panel, an inorganic EL panel, or a transmissive display device such as a TFT liquid crystal panel can be used.

In the above embodiment, the second display unit 16b has been described as a display unit overlaid on the display screen of the first display unit 16a, but is not limited thereto. That is, in the case where the first display unit 16a is configured as a transmissive display device, it is possible to overlay the first display unit 16a on the display screen of the second display unit 16b.

The series of processing described above can be executed by hardware or can also be executed by software.

In other words, the functional configuration in FIG. 2 is merely an example and is not particularly limited. That is, the information processing apparatus 100 only needs to have a function capable of executing the series of processing described above as a whole, and which functional block is used to achieve this function is not particularly limited by the example in FIG. 2.

A single functional block may be configured by hardware alone, may be configured by software alone, or may be configured by a combination thereof.

In the case where the series of processing is executed by software, a program configuring the software is installed on a computer or the like via a network or a recording medium.

The computer may be a computer incorporated in dedicated hardware. The computer may be a computer capable of installing various programs to execute various functions and may be, for example, a general-purpose personal computer.

A recording medium storing those programs includes not only a removable medium that is distributed separately from the device main body in order to provide the programs to a user, but also, for example, a recording medium that is provided to the user in a state in which the recording medium is incorporated into the device main body in advance. The removable medium includes, for example, a magnetic disk (including a floppy disk), an optical disc, and a magneto-optical disc. The optical disc includes, for example, a Compact Disk-Read Only Memory (CD-ROM), a Digital Versatile Disk (DVD), and a Blu-ray (registered trademark) disc. The magneto-optical disc includes a Mini-Disk (MD) and the like. Further, the recording medium that is provided to a user in a state in which the recording medium is incorporated into the device main body in advance includes, for example, the ROM 13 shown in FIG. 2, in which programs are recorded, and a hard disk included in the storage unit 15 shown in FIG. 2.

Note that, in this specification, steps written as the programs recorded in the recording medium include not only processing performed in time series in order of the steps, but also processing which is not necessarily processed in time series, i.e., which is executed in parallel or individually.

Hereinabove, although several embodiments of the present invention have been described, those embodiment are merely examples and do not limit the technical scope of the present invention. The present invention may employ other various embodiments, and various changes such as omission and replacement can be performed within the scope of the present invention. Those embodiments and modifications thereof fall within the spirit and the scope of inventions disclosed in this specification and the like and fall within the scope of the inventions recited in claims and equivalents thereof.

What is claimed is:

1. An information processing apparatus comprising:
a display unit; and
a computing device configured to:
acquire behavior history information based on behavior of a user;
acquire predetermined behavior information from the behavior history information;

acquire a display information indicating a display location of the behavior history information and the predetermined behavior information on the display unit;

display the behavior history information and the predetermined behavior information on the display unit based on the acquired display information, wherein a display appearance of the behavior history information is different from a display appearance of the predetermined behavior information;

determine a first coordinate axis on the basis of the behavior history information and the predetermined behavior information so that a first mark indicating the behavior history information and a second mark indicating the predetermined behavior information are simultaneously displayed on the display unit;

determine a second coordinate axis on the basis of the behavior history information so that the first mark indicating the behavior history information is displayed on the display unit and the second mark indicating the predetermined behavior information is not displayed on the display unit;

acquire notification information in relation to the predetermined behavior information; and display, with respect to the first coordinate axis, the first mark and the second mark on the display unit and subsequently update display on the display unit so that the first mark is placed with respect to the second coordinate axis and, with regard to the predetermined behavior information, the notification information is displayed, without displaying the second mark, wherein:

in the case where a difference between a value of current behavior information and a value of the predetermined behavior information is equal to or less than a value set in advance, the computing device displays the first mark and the second mark on the first coordinate axis on the display unit and then does not switch the first coordinate axis to the second coordinate axis on the display unit.

2. An information processing apparatus comprising:
a display unit; and
a computing device configured to:
acquire behavior history information based on behavior of a user;
acquire predetermined behavior information from the behavior history information;
acquire a display information indicating a display location of the behavior history information and the predetermined behavior information on the display unit;
simultaneously display the behavior history information and the predetermined behavior information on the display unit based on the acquired display information, wherein a display appearance of the behavior history information is different from a display appearance of the predetermined behavior information; and
display accompanying regions in which respective contents of current behavior information and the predetermined behavior information are displayed in the vicinity of display positions of the current behavior information and the predetermined behavior information, and, in the case where a difference between the current behavior information and the predetermined behavior information is equal to or less than a value set in advance, change at least one display position of the accompanying regions of the current behavior information and the predetermined behavior information to other display position at which the at least one display position does not interfere with the other display position.

3. The information processing apparatus according to claim 2, wherein:
the computing device simultaneously displays the current behavior information, the behavior history information, and the predetermined behavior information on the display unit in a state in which the current behavior information is continuously added to the behavior history information.

4. The information processing apparatus according to claim 3, wherein:
the computing device displays the current behavior information and the predetermined behavior information on the display unit so that the current behavior information and the predetermined behavior information are placed on a first coordinate axis.

5. The information processing apparatus according to claim 4, wherein:
the computing device highlights the current behavior information and the predetermined behavior information by identifying the display positions of the current behavior information and the predetermined behavior information.

6. The information processing apparatus according to claim 2, wherein:
the computing device is configured to determine whether to acquire the predetermined behavior information from the behavior history information; and
in the case where the computing device determines that the computing device acquires the predetermined behavior information from the behavior history information displayed by the display unit, the computing device distinguishably displays a part corresponding to the predetermined behavior information in the behavior history information.

7. The information processing apparatus according to claim 2, wherein:
the computing device is configured to determine whether to acquire the predetermined behavior information from the behavior history information; and
in the case where the computing device determines that the computing device acquires the predetermined behavior information from the behavior history information displayed by the display unit, the computing device displays current behavior information and the predetermined behavior information on the display unit so that the current behavior information and the predetermined behavior information are placed on the first coordinate axis.

8. The information processing apparatus according to claim 2, wherein
the computing device is further configured to:
set one of a normal mode in which quality of a display content is prioritized and a save mode in which low power consumption processing is prioritized, and
reduce an acquisition frequency of the behavior history information in the save mode, as compared with the normal mode.

9. The information processing apparatus according to claim 2, wherein:

in the case where there is a deficient area in which the behavior history information is not acquired, the computing device executes processing of interpolating the deficient area.

10. The information processing apparatus according to claim 2, wherein:
the predetermined behavior information is the past highest altitude.

11. The information processing apparatus according to claim 2, wherein:
the computing device highlights the current behavior information and the predetermined behavior information by displaying the first mark, second mark, and numerical values indicating the current behavior information and the predetermined behavior information.

12. The information processing apparatus according to claim 2, wherein:
the information processing apparatus is mounted on the user, and
the computing device acquires the behavior history information based on behavior of the user on which the information processing apparatus is mounted.

13. An information processing method of an information processing apparatus including a display unit, the method comprising:
acquiring behavior history information based on behavior of a user;
acquiring predetermined behavior information from the behavior history information;
acquiring a display information indicating a display location of the behavior history information and the predetermined behavior information on the display unit;
simultaneously displaying the behavior history information and the predetermined behavior information on the display unit based on the acquired display information, wherein a display appearance of the behavior history information is different from a display appearance of the predetermined behavior information; and
displaying accompanying regions in which respective contents of current behavior information and the predetermined behavior information are displayed in the vicinity of display positions of the current behavior information and the predetermined behavior information, and, in the case where a difference between the current behavior information and the predetermined behavior information is equal to or less than a value set in advance, changing at least one display position of the accompanying regions of the current behavior information and the predetermined behavior information to other display position at which the at least one display position does not interfere with the other display position.

14. The information processing method according to claim 13, further comprising:
displaying the current behavior information in the behavior history information and the predetermined behavior information on the display unit simultaneously so as to be placed on a first coordinate axis.

15. The information processing method according to claim 13, further comprising:
displaying the current behavior information in the behavior history information and the predetermined behavior information simultaneously which are highlighted by identifying the display positions of the current behavior information and the predetermined behavior information.

16. A non-transitory computer-readable recording medium storing a program for causing a computer configured to control an information processing apparatus including a display unit to execute:
a first acquisition function of acquiring behavior history information based on behavior of a user;
a second acquisition function of acquiring predetermined behavior information from the behavior history information;
a third acquisition function of acquiring a display information indicating a display location of the behavior history information and the predetermined behavior information on the display unit;
a display control function of simultaneously displaying the behavior history information acquired by the first acquisition function and the predetermined behavior information acquired by the second acquisition function on the display unit based on the acquired display information, wherein a display appearance of the behavior history information is different from a display appearance of the predetermined behavior information; and
a second display control function of displaying accompanying regions in which respective contents of current behavior information and the predetermined behavior information are displayed in the vicinity of display positions of the current behavior information and the predetermined behavior information, and, in the case where a difference between the current behavior information and the predetermined behavior information is equal to or less than a value set in advance, and changing at least one display position of the accompanying regions of the current behavior information and the predetermined behavior information to other display position at which the at least one display position does not interfere with the other display position.

17. An information processing method of an information processing apparatus including a display unit, the method comprising:
acquiring behavior history information based on behavior of a user;
acquiring predetermined behavior information from the behavior history information;
acquiring a display information indicating a display location of the behavior history information and the predetermined behavior information on the display unit;
displaying the behavior history information and the predetermined behavior information on the display unit based on the acquired display information, wherein a display appearance of the behavior history information is different from a display appearance of the predetermined behavior information;
determining a first coordinate axis on the basis of the behavior history information and the predetermined behavior information so that a first mark indicating the behavior history information and a second mark indicating the predetermined behavior information are simultaneously displayed on the display unit;
determining a second coordinate axis on the basis of the behavior history information so that the first mark indicating the behavior history information is displayed on the display unit and the second mark indicating the predetermined behavior information is not displayed on the display unit;
acquiring notification information in relation to the predetermined behavior information; and displaying, with respect to the first coordinate axis, the first mark and the second mark on the display unit and subsequently updating display on the display unit so that the first mark is placed with respect to the second coordinate axis and, with regard to the predetermined behavior information, the notification information is displayed, without displaying the second mark, wherein:

in the case where a difference between a value of current behavior information and a value of the predetermined behavior information is equal to or less than a value set in advance, displaying the first mark and the second mark on the first coordinate axis on the display unit and then does not switch the first coordinate axis to the second coordinate axis on the display unit.

\* \* \* \* \*